United States Patent
Sejalon

(10) Patent No.: US 7,387,696 B2
(45) Date of Patent: Jun. 17, 2008

(54) TIRE TREAD DESIGN AND THE CONSTRUCTION METHOD THEREOF

(75) Inventor: Olivier Sejalon, Chamalieres (FR)

(73) Assignee: Michelin Recherche et Technique S. A., Granges-Paccot (CH)

(*) Notice: Subject to any disclaimer, the term of this patent is extended or adjusted under 35 U.S.C. 154(b) by 68 days.

(21) Appl. No.: 10/902,561

(22) Filed: Jul. 29, 2004

(65) Prior Publication Data
US 2005/0022916 A1   Feb. 3, 2005

Related U.S. Application Data

(63) Continuation of application No. PCT/EP03/00779, filed on Jan. 27, 2003.

(30) Foreign Application Priority Data
Jan. 31, 2002   (FR) .................................... 02 01179

(51) Int. Cl.
- B29D 30/00 (2006.01)
- B29D 30/52 (2006.01)
- G06F 17/00 (2006.01)
- G06F 17/50 (2006.01)
- B60C 11/03 (2006.01)

(52) U.S. Cl. ............................ 156/110.1; 152/209.2; 152/209.8; 703/6; 703/8

(58) Field of Classification Search ............. 156/110.1; 703/6, 8; 152/209.2, 209.3, 209.8, 209.9
See application file for complete search history.

(56) References Cited

U.S. PATENT DOCUMENTS 2,808,867 A   10/1957   Buddenhagen et al.

(Continued)

FOREIGN PATENT DOCUMENTS

EP   0 114 594   8/1984

(Continued)

OTHER PUBLICATIONS

International Search Report for PCT/EP 03/00779, issued Apr. 11, 2003.

(Continued)

*Primary Examiner*—Steven D. Maki
(74) *Attorney, Agent, or Firm*—Buchanan Ingersoll & Rooney PC

(57) ABSTRACT

A tire tread, comprising a tread pattern formed of groups of motifs arranged, in the transverse direction, in a number M of distributions at least equal to two and of average width Li, Lj, the total of the widths Li, Lj being at least equal to 80% of the width L of the tread, each distribution of groups of motifs being formed by a succession of a plurality of groups, at least two of said groups of motifs of the distribution in question having different longitudinal lengths, the ratio Ri between the longitudinal length of the smallest group of motifs and the largest group of motifs being strictly less than one, this tread being characterized in that for at least two distributions comprising respectively Ni and Nj motifs, with Ni<Nj, the following relationships are satisfied:

$0.20 \leq T_{ij} \leq 0.50$, $0.60 \leq R_{pg} \leq 0.66$ where Tij, which represents the amount of overlap between the distributions, is calculated by the following formula:

$$Tij = \frac{\left[\frac{Ni}{Ri} - Nj \cdot Rj\right]}{\left[\frac{Nj}{Rj} - Ni \cdot Ri\right]},$$

where $R_{pg}$, which designates an "estimated overall pitch ratio" between the M distributions, is obtained by the following formula:

$$R_{pg} = \sqrt{\frac{Min_{i=1}^{M}(N_i R_i)}{Max_{i=1}^{M}\left(\frac{N_i}{R_i}\right)}}.$$

2 Claims, 2 Drawing Sheets

U.S. PATENT DOCUMENTS

| | | | | |
|---|---|---|---|---|
| 2,878,852 A | * | 3/1959 | Lippmann et al. | 152/209.2 |
| 4,474,223 A | * | 10/1984 | Landers | 152/209.2 |
| 4,721,141 A | * | 1/1988 | Collette et al. | 152/209.2 |
| 5,062,461 A | * | 11/1991 | Noguchi | 152/209.2 |
| 5,309,965 A | * | 5/1994 | Williams | 152/209.2 |
| 5,360,043 A | * | 11/1994 | Croyle et al. | 152/209.9 |
| 5,746,848 A | | 5/1998 | Hahn et al. | |
| 5,753,057 A | * | 5/1998 | Wesolowski | 152/29 |
| 5,865,921 A | * | 2/1999 | Zakelj et al. | 156/110.1 |
| 2003/0041949 A1 | * | 3/2003 | Takigawa et al. | 156/123 |

FOREIGN PATENT DOCUMENTS

| | | | |
|---|---|---|---|
| EP | 114594 | * | 4/1989 |
| EP | 0 524 568 | | 1/1993 |
| EP | 0 630 767 | | 12/1994 |
| EP | 0 724 972 | | 8/1996 |
| JP | 63-159110 | * | 7/1988 |
| JP | 5221206 | | 8/1993 |

OTHER PUBLICATIONS

International Preliminary Examination Report.
International Preliminary Examination Report, no date.

* cited by examiner

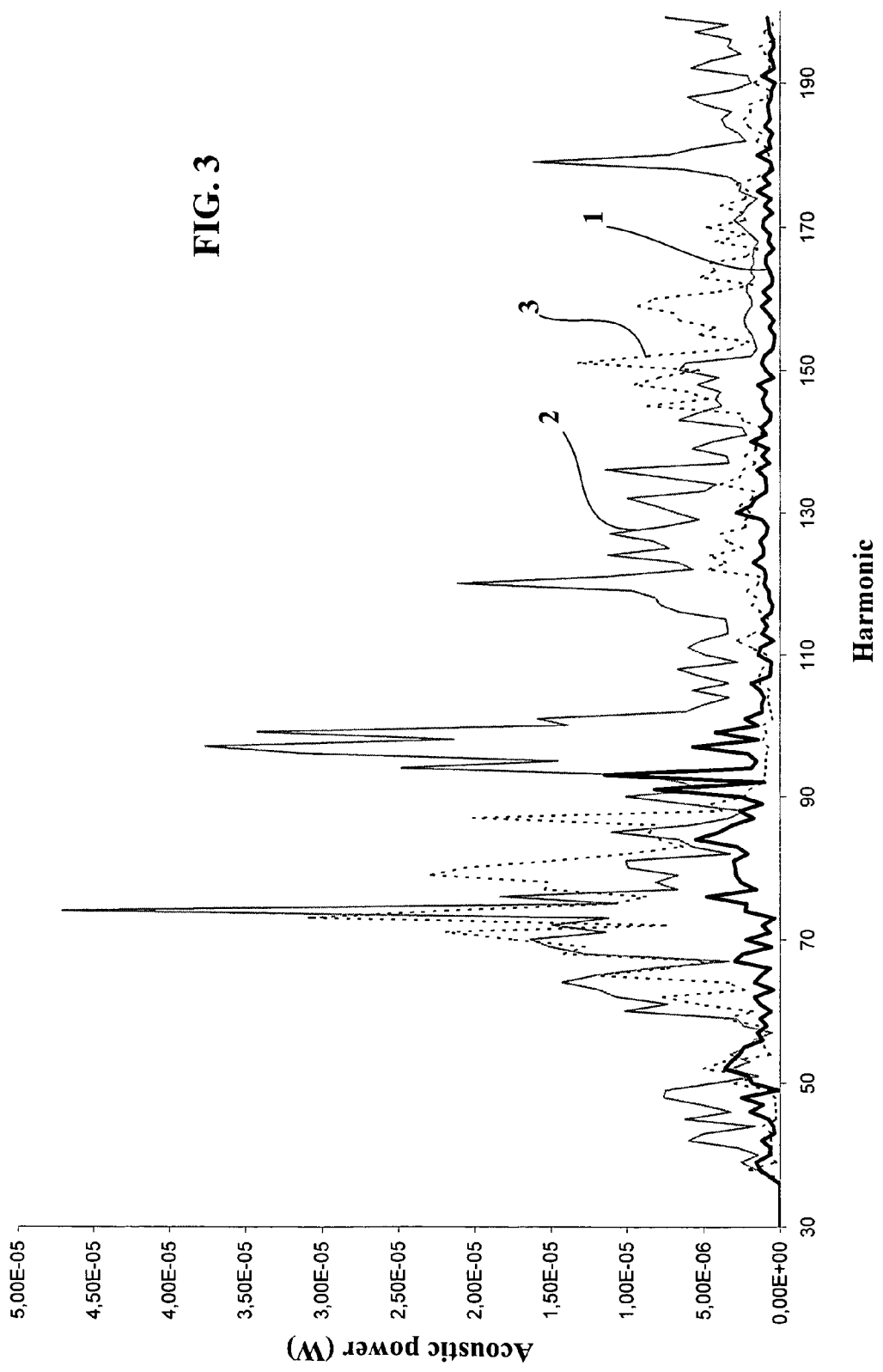

TIRE TREAD DESIGN AND THE CONSTRUCTION METHOD THEREOF

CROSS REFERENCE TO RELATED APPLICATIONS

This application claims is a continuation of International Application No. PCT/EP03/00779, filed Jan. 27, 2003, which further claims priority to French Patent Application No. FR/02/01179, filed Jan. 31, 2002, and published in the French language as WO2003/064187 on Aug. 7, 2003.

FIELD OF INVENTION

The invention relates to a tread intended to be fitted on a passenger-car tire; it relates more particularly to a tread the tread pattern of which very substantially reduces the running noise. It also relates to a method for defining a tread pattern making it possible to reduce the running noise.

BACKGROUND OF INVENTION

In order to reduce the running noise of a tire provided with a tread comprising a tread pattern, it is known to place in sequence, in the longitudinal direction of this tread, a succession of motifs derived from one and the same elementary motif, except for a scale ratio, so as to distribute the acoustic energy as homogeneously as possible over a wider range of frequencies.

It is also known, for example from EP 114 594, to construct a tread pattern comprising side by side at least two annular distributions each formed of a plurality of repeating motifs, the number of motifs of an annular distribution located on one half of the tread being of between 5% and 50% of the number of motifs of another annular distribution located on the other half of the same tread.

Although on average it makes it possible to improve the subjective perception of the occupants of a vehicle during travel, the latter construction technique in a certain number of cases leads to relatively poor-quality results in terms of noise inside the vehicle. It was therefore necessary to determine complementary rules for optimization of the construction of a tire tread pattern and in particular one for a passenger-vehicle tire.

Furthermore, documents EP 524 568 and U.S. Pat. No. 2,808,867 both propose tread patterns comprising a plurality of distributions without however laying down precise construction rules for the different distributions which make it possible to optimize the performance of the tread patterns.

The invention described here proposes providing a method for constructing a tire tread pattern having at least two different distributions with the aim of reducing the acoustic discomfort felt inside a vehicle.

SUMMARY OF THE INVENTION

According to the invention, the tire tread of width L comprises a tread pattern formed of a plurality of groups of motifs, these groups forming in the transverse direction of the tread a number of distributions M at least equal to two annular distributions of groups of motifs of different index (i) and (j) and of average width Li, Lj, the total of these widths Li, Lj being at least equal to 80% of the width L of the tread, each annular distribution of groups of motifs being formed by a succession of a plurality of groups of motifs, each group being derived from one and the same group of elementary motifs, at least two of said groups of motifs of the distribution in question having different longitudinal lengths and the ratio Ri between the longitudinal length of the smallest group of motifs and that of the largest group of motifs of said distribution being strictly less than one, this tread being characterized in that for at least two annular distributions comprising respectively Ni and Nj motifs, Ni being strictly less than Nj, the following relationships are satisfactory:

$$0.20 \leq T_{ij} \leq 0.50$$

$$0.60 \leq R_{pg} \leq 0.66,$$

where Tij, which designates an "amount of overlap" between said at least two distributions in question taken two by two, is obtained by the following formula:

$$T_{ij} = \frac{\left[\frac{Ni}{Ri} - Nj \cdot Rj\right]}{\left[\frac{Nj}{Rj} - Ni \cdot Ri\right]},$$

and where $R_{pg}$, which designates an "estimated overall pitch ratio" between all the M distributions, is obtained by the following formula:

$$R_{pg} = \sqrt{\frac{\text{Min}_{i=1}^{M}(N_i R_i)}{\text{Max}_{i=1}^{M}\left(\frac{N_i}{R_i}\right)}}.$$

In the case of a single distribution (M=1), it will be noted that the estimated overall pitch ratio would be equal to the pitch ratio.

The tread according to the invention makes it possible to avoid the existence of an emergence in the acoustic emission spectrum which might result from an excessive interaction between the annular distributions; this tread also makes it possible to avoid the appearance of isolated packets of acoustic energy resulting from insufficient interaction between the distributions.

When the amount of overlap Tij is greater than 0.5, the presence will be noted, in the acoustic emission spectrum, of a frequency zone of greater energy than the others which is liable to result in the occurrence of discomfort for the passengers of a vehicle, this discomfort being linked to a whining or beating noise.

When the amount of overlap Tij is less than 0.20, it will be observed that the acoustic energy is distributed in the frequency spectrum by isolated packets and, under these conditions, the noise caused by the tires no longer merges into the acoustic environment of the passenger compartment; a beating noise appears in the vehicle.

The range of values proposed for the estimated overall pitch ratio $R_{pg}$ makes it possible to avoid the existence of acoustic energy at low frequencies which corresponds to a range in which the filtering of the vehicles is least effective. This range also makes it possible to avoid excessively large differences in tread pattern rigidity in order to guarantee correction operation of the tire.

Preferably, when the tread pattern of a tread comprises only two annular distributions of the groups of motifs, the interaction effect is optimal when the amount of overlap Tij is of between 0.30 and 0.42 while maintaining an overall pitch ratio of between 0.6 and 0.66.

When the tread pattern of a tread comprises more than two annular distributions, it is advantageous for the distribution comprising the largest number of groups of motifs and the distribution comprising the smallest number of groups of motifs to have an amount of overlap of between 0.20 and 0.38 with an estimated overall pitch ratio $R_{pg}$ of between 0.6 and 0.63.

Advantageously, and whatever the number of distributions, the ratio Ri of each distribution satisfies the following relationship:

$$0.5 \leq Ri \leq 0.8$$

If the value of the ratio Ri of a distribution is greater than 0.8, the acoustic energy of said distribution is distributed over a limited number of frequencies and may result in discomfort in the passenger compartment of whining type.

If the value of the ratio Ri is less than 0.5, it is very difficult to find a satisfactory balance between the distributions.

Preferably, the different annular distributions have a void ratio, that is a ratio between the total surface of the tread reduced by the true contact surface and the total surface of the tread, of between 0.15 and 0.45.

Preferably, the differences between the void ratios of the annular distributions of one and the same tread are at most 0.10. This condition makes it possible to limit the dissymmetries between the annular distributions which may result in difficulties in regulating the equilibrium of the performances. Furthermore, and even if it is not totally sufficient, this condition makes it possible to guarantee relative equality of the contributions of each annular distribution to the overall noise of the tread pattern and thus to promote homogeneous distribution of the energy in the acoustic radiation spectrum, which enables the noise of the tire to merge better into the acoustic environment of the passenger compartment.

The invention also proposes a method of reducing the running noise of a tire provided with a tread of width L and having a tread pattern formed of a plurality of tread pattern motifs by optimization of the effect of interaction of the tread pattern distributions of said tread. The method according to the invention comprises the following steps for a tread pattern formed of two distributions:

A—creation/formation of a first annular distribution from at least two groups of motifs of different average lengths, this distribution comprising Ni groups, the ratio between the shortest length and the longest length in the longitudinal direction being equal to Ri;

B—creation of a second annular distribution from at least two groups of motifs of different average lengths, this distribution comprising Nj groups, the ratio between the shortest length and the longest length in the longitudinal direction being equal to Rj;

C—calculation of the values of the amount of overlap Tij and of the estimated overall pitch ratio $R_{pg}$ from the values Ni, Ri, Nj, Rj from the following formulae:

$$Tij = \frac{\left[\frac{Ni}{Ri} - Nj \cdot Rj\right]}{\left[\frac{Nj}{Rj} - Ni \cdot Ri\right]}$$

$$R_{pg} = \sqrt{\frac{\text{Min}_{i=1}^{2}(N_i R_i)}{\text{Max}_{i=1}^{2}\left(\frac{N_i}{R_i}\right)}}$$

D—comparison of the calculated value of Tij with a desired value of between 0.20 and 0.50 and comparison of the calculated value of $R_{pg}$ with a desired value of between 0.6 and 0.66;

E—if the calculated value of Tij is not between 0.20 and 0.50 or if the calculated value of $R_{pg}$ is not between 0.60 and 0.66, modification of at least one value from among the following values: Ni, Nj, Ri, Rj and resumption of steps C and D until the following relationships are satisfied: $0.20 \leq Tij \leq 0.50$ and $0.60 \leq R_{pg} \leq 0.66$.

This method of reducing the running noise of a tire is particularly advantageous because it releases degrees of freedom for adjusting the equilibrium of the running performances of this tire.

This method may, of course, be applied to the treatment of more than two distributions, for example by ensuring that, taken two by two in the order of increase in the number of motifs of said annular distributions, the amounts of overlap of these distributions are effectively between 0.20 and 0.50 and preferably between 0.30 and 0.42, and that furthermore the estimated overall pitch ratio $R_{pg}$ is of between 0.6 and 0.66.

If the distributions are arranged by their respective number of motifs N1, N2, N3 in increasing order (N3 greater than N2, which in turn is greater than N1), another way of applying the method according to the invention consists of determining the following parameters: number of groups of motifs and ratio of the smallest to the largest group for all the pairs of distributions corresponding to the numbers of motifs (N1, N2) and (N2, N3) so that the amounts of overlap of each of these pairs are between 0.20 and 0.50 and preferably between 0.30 and 0.42. In this case, it is also necessary for the estimated overall pitch ratio $R_{pg}$ to be between 0.6 and 0.66.

BRIEF DESCRIPTION OF THE DRAWINGS

Other characteristics and advantages of the invention will become apparent from the description given hereafter with reference to the figures, which show, by way of non-limitative example, a tire tread pattern according to the invention and in which:

FIG. 3 shows the acoustic radiation spectra measured for three different tread patterns, one of these tread patterns corresponding to the tread pattern according to the invention shown in FIG. 1.

DESCRIPTION OF THE PREFERRED EMBODIMENTS

Figure 1:
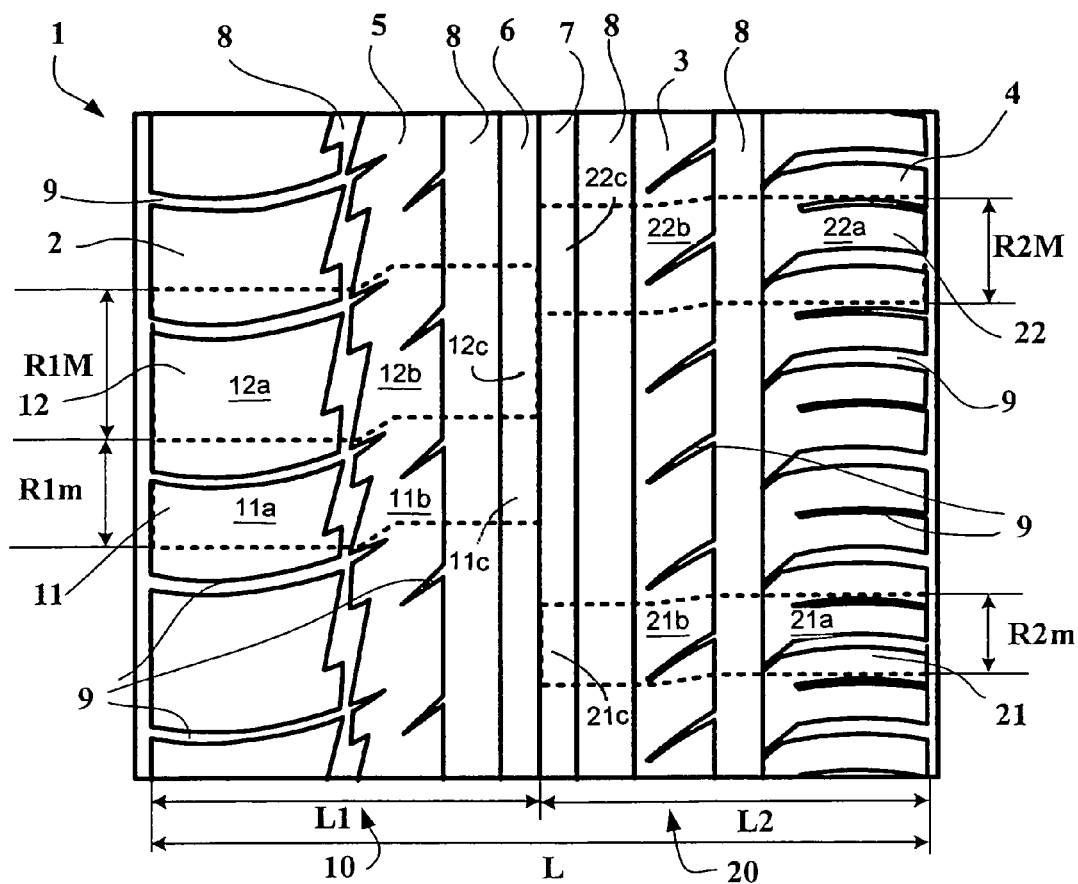
FIG. 1 shows a view of the surface of a novel tread pattern constructed according to the invention.

FIG. 1 shows a partial view (in the longitudinal direction) of the surface of a tread pattern of a tread 1 according to the invention; in this FIG. 1, the contours in unbroken lines correspond to the limits of the motifs in relief 2, 3, 4, 5, 6, 7 on the contact surface of the tread when new.

This tread pattern is formed of two annular distributions each formed of a plurality of groups of motifs in relief 11, 12, 21, 22.

A first annular distribution 10 occupies an axial width L1 substantially equal to half of the width L of the tread. This first annular distribution 10 is composed of N1 (equal in this case to 55) groups of motifs in relief 11, 12, said motifs being defined by transverse or axial grooves 9 and longitudinal grooves 8. Thus, a group 11 comprises motifs 11a, 11b, and 11c; and a group 12 comprises motifs 12a, 12b, and 12c. The first distribution 10 comprises groups 12 of maximum length R1M equal to 43.545 mm and groups 11 of minimum length R1m equal to 30.917 mm (which gives a pitch ratio R1=R1m/R1M equal to 0.71). Groups of motifs of intermediate length equal to 36.16 mm are also provided. The void ratio of the first distribution 10 (corresponding to the ratio of the surface of the tread which is not in conktact with the ground to the total surface) here is equal to 29% for each group of motifs.

A second annular distribution 20 occupies an axial width L2 substantially equal to half the width L of the tread. The second annular distribution is composed of N2 (equal in this case to 75) groups of motifs in relief 21, 22, said motifs being defined by transverse or axial grooves 9 and longitudinal grooves 8. Thus, a group 21 comprises motifs 21a, 21b and 21c; and a group 22 comprising motifs 22a, 22b, and 22c. The second distribution 20 comprises groups 22 of maximum length R2M equal to 30.797 mm and groups 21 of minimum length R2m equal to 23.098 mm (which gives a pitch ratio R2=R2m/R2M equal to 0.75). Groups of motifs of intermediate length equal to 26.398 mm are also provided. The void ratio of this second distribution 20 (corresponding to the ratio of the surface of the tread which is not in contact with the ground to the total surface) here is equal to 39% for each group of motifs.

Taking into account the values selected for the two annular distributions 10 and 20, this tread pattern has an amount of overlap Tij equal to 0.35 and an estimated overall pitch ratio $R_{pg}$ equal to 0.625.

Figure 2:
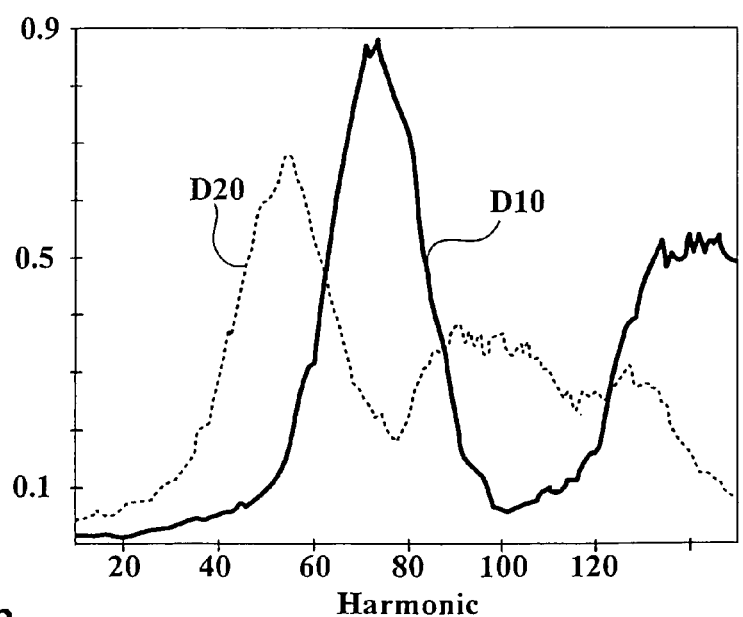
FIG. 2 shows the theoretical distribution of the acoustic energy of each annular distribution for the tread pattern of FIG. 1.

With such a configuration, the theoretical distribution of the acoustic energy in the acoustic radiation spectrum is relatively uniform, as can be seen in FIG. 2. In this FIG. 2, which represents a graph bearing the harmonic rank on the abscissa and the relative amplitude of energy emitted on the ordinate, the theoretical distributions of energy have been plotted for each annular distribution of the tread pattern shown in FIG. 1 (the distribution D10, in unbroken lines, corresponds to the distribution 10 and the distribution D20, in broken lines, corresponds to the distribution 20).

It was furthermore noted that the distribution having the lowest void ratio contributes least to the total distribution of the energy and that it was preferable for the difference in the void ratio between the annular distributions to be less than 10% in order to ensure homogenous distribution of the energy in the acoustic radiation spectrum, which enables the noise of the tire to merge better into the acoustic environment of the passenger compartment. In order to obtain good behavior on dry ground of a vehicle fitted with tires provided with a tread pattern according to the invention, it is advantageous for the first distribution to be placed on the outside relative to said vehicle.

FIG. 3 shows the results of measurements of acoustic power of three tires P1, P2, P3 of dimension 225/40 R 18 from the Sports sector:

the tire P1 is provided with a tread according to the invention, the tread pattern design of which is shown in FIG. 1 (its spectrum is represented by a thick black line, marked by the reference 1);

the tire P2 is provided with a tread pattern comprising two annular distributions, one comprising 45 groups of motifs having a pitch ratio equal to 0.8, the other comprising 68 groups and having a pitch ratio of 0.81. The amount of overlap Tij is then equal to 0.02 and the estimated overall pitch ratio $R_{pg}$ is equal to 0.655 (its spectrum is shown by a grey line, marked by the reference 2);

the tire P3 corresponds to a conventional tire and is provided with a mono-distribution tread pattern comprising 72 groups of motifs and having a pitch ratio of 0.71 the distribution of the motifs in relief of which has been optimized so as to reduce substantially the acoustic energy according to methods known to the person skilled in the art referred to in the introduction. Taking $N_1=N_2$ and $R_1=R_2$, this tread pattern has an amount of overlap equal to one and an estimated overall pitch ratio equal to the pitch ratio, that is to say 0.71 (its spectrum is shown by broken lines, marked by the reference 3).

These three tires were measured in a semi-anechoic chamber under the following conditions: load: 412 daN, pressure: 2.5 bar, speed: 80 km/h.

It will be noted that the spectrum of the tread pattern according to the invention P1 is located very substantially below the level of the spectra of the other two tires P2 and P3.

Furthermore, the spectrum of the tire (P1) does not exhibit either emergence or isolated packets of acoustic energy, unlike the spectrum of tire P2, where the energy is distributed in 4 distinct packets: the first below the harmonic 50 Hz, a second around the harmonic 75 Hz, a third around the harmonic 100 Hz and the last around the harmonic 130 Hz.

The invention is of course not limited to the single example described, and various modifications may be made thereto by the person skilled in the art using his knowledge.

The invention claimed is:

1. A method for optimizing and reducing the running noise of a tire provided with a tread having a tread pattern formed of a plurality of tread pattern motifs, this method comprising the following steps:

A—forming a first annular distribution from at least two groups of motifs of different respective lengths, this first distribution comprising Ni groups, the ratio between the shortest length and the longest length in the longitudinal direction being equal to Ri;

B—creating a second annular distribution from at least two groups of motifs of different respective lengths, this second distribution comprising Nj groups, the ratio between the shortest length and the longest length in the longitudinal direction being equal to Rj;

C—calculating a value of an amount of overlap Tij and of the estimated overall pitch ratio $R_{pg}$ from the values Ni, Ri, Nj, Rj using the following formulae wherein M is the total number of distributions:

$$Tij = \frac{\left[\frac{Ni}{Ri} - Nj \cdot Rj\right]}{\left[\frac{Nj}{Rj} - Ni \cdot Ri\right]}$$

$$R_{pg} = \sqrt{\frac{\operatorname{Min}_{i=1}^{2}(N_i R_i)}{\operatorname{Max}_{i=1}^{2}\left(\frac{N_i}{R_i}\right)}}$$

D—comparing the calculated value of Tij with a desired value of between 0.20 and 0.50 and comparing the calculated value of $R_{pg}$ with a desired value of between 0.6 and 0.66; and E—if this calculated value of Tij is not between 0.20 and 0.50 or if the calculated value of $R_{pg}$ is not between 0.60 and 0.66, then modifying at least one value selected from among the values of Ni, Nj, Ri, Rj and resuming steps C and D until the following relationships are satisfied:

$0.20 \leq Tij \leq 0.50$ and $0.60 \leq R_{pg} \leq 0.66$.

2. The method according to claim 1, further including constructing a tire provided with a tread having the first annular distribution of at least two groups of motifs of different respective lengths and the second annular distribution of at least two groups of motifs of different respective length such that the constructed tire defines the calculated Tij and the calculated value Rpg which satisfy the relationships in step E and the step of mounting the tire on a vehicle with the first distribution disposed at an edge of the tread which is adjacent a side of the tire facing away from the vehicle.

* * * * *